(12) United States Patent
Lee et al.

(10) Patent No.: US 11,259,286 B2
(45) Date of Patent: Feb. 22, 2022

(54) METHOD AND APPARATUS FOR TRANSMITTING OR RECEIVING UPLINK SIGNAL FOR TERMINAL SUPPORTING SHORT TTI IN WIRELESS COMMUNICATION SYSTEM

(71) Applicant: LG Electronics Inc., Seoul (KR)

(72) Inventors: Hyunho Lee, Seoul (KR); Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 16/065,717

(22) PCT Filed: Mar. 22, 2018

(86) PCT No.: PCT/KR2018/003351
§ 371 (c)(1),
(2) Date: Jun. 22, 2018

(87) PCT Pub. No.: WO2018/174592
PCT Pub. Date: Sep. 27, 2018

(65) Prior Publication Data
US 2021/0204272 A1 Jul. 1, 2021

Related U.S. Application Data

(60) Provisional application No. 62/569,466, filed on Oct. 6, 2017, provisional application No. 62/565,012, filed
(Continued)

(51) Int. Cl.
*H04W 4/00* (2018.01)
*H04W 72/04* (2009.01)
*H04B 1/713* (2011.01)

(52) U.S. Cl.
CPC ........ *H04W 72/0413* (2013.01); *H04B 1/713* (2013.01); *H04W 72/0446* (2013.01)

(58) Field of Classification Search
CPC .............. H04B 1/713; H04W 72/0413; H04W 72/0446
See application file for complete search history.

(56) References Cited

U.S. PATENT DOCUMENTS 10,516,517 B2 * 12/2019 Xiong ................... H04L 5/0053
2009/0180436 A1 * 7/2009 Vujcic ..................... H04L 23/02
370/330
(Continued)

FOREIGN PATENT DOCUMENTS

CN 106455097 9/2019

OTHER PUBLICATIONS

Japanese Office Action in Japanese Application No. 2019-510695, dated Jan. 28, 2020, 10 pages (with English translation).
(Continued)

*Primary Examiner* — Bo Hui A Zhu
(74) *Attorney, Agent, or Firm* — Fish & Richardson P.C.

(57) ABSTRACT

An uplink transmitting method for a user equipment (UE) for supporting a short transmission time interval (TTI) length in a wireless communication system is performed by the UE and includes receiving an enable or disable configuration of frequency hopping for uplink control information, when the frequency hopping is enabled, mapping the uplink control information to a short physical uplink control channel (SPUCCH) resource region using the frequency hopping, and transmitting the uplink control information in the SPUCCH resource region, wherein the frequency hopping has different patterns in first and second slots.

9 Claims, 9 Drawing Sheets

Related U.S. Application Data on Sep. 28, 2017, provisional application No. 62/544,133, filed on Aug. 11, 2017, provisional application No. 62/543,383, filed on Aug. 10, 2017, provisional application No. 62/505,794, filed on May 12, 2017, provisional application No. 62/476,607, filed on Mar. 24, 2017.

(56) References Cited

U.S. PATENT DOCUMENTS

| | | | |
|---|---|---|---|
| 2016/0205692 A1 | 7/2016 | Zhang | |
| 2016/0226639 A1 | 8/2016 | Xiong et al. | |
| 2020/0053722 A1* | 2/2020 | Choi | H04L 1/1819 |
| 2020/0100240 A1* | 3/2020 | Takeda | H04L 5/001 |

OTHER PUBLICATIONS

Qualcomm Incorporated, "sPUCCH Format Design," R1-1704989, 3GPP TSG RAN WG1 #88b, Spokane, USA, dated Apr. 3-7, 2017, 9 pages.

Intel Corporation, "Remaining details related to new PUCCH Format," R1-155305, 3GPP TSG-RAN WG1 #82Bis, Malmö, Sweden, dated Oct. 5-9, 2015, 4 pages.

LG Electronics, "Support of uplink channel multiplexing for NR," R1-1710321, 3GPP TSG RAN WG1 NR Ad-Hoc#2, Qingdao, P.R. China, dated Jun. 27-30, 2017, 7 pages.

Office Action in Chinese Appln. No. 201880014231.4, dated Jul. 1, 2021, 17 pages (with English translation).

Huawei, HiSilicon, "Multiplexing of UL control channel and SRS in NR," R1-1701649, 3GPP TSG RAN WG1 Meeting #88, Athens, Greece, Feb. 13-17, 2017, 4 pages.

Huawei, HiSilicon, "Discussion on sPUCCH design," R1-1701736, 3GPP TSG RAN WG1 Meeting #88, Athens, Greece, Feb. 13-17, 2017, 5 pages.

Huawei, HiSilicon, "sPUCCH Resource allocation," R1-1701737, 3GPP TSG RAN WG1 Meeting #88, Athens, Greece, Feb. 13-17, 2017, 4 pages.

ZTE, ZTE Microelectronics, "sPUCCH format design," R1-1701973, 3GPP TSG RAN WG1 Meeting #88, Athens, Greece Feb. 13-17, 2017, 6 pages.

NTT Docomo, Inc., "Views on sPUCCH design," R1-1702784, 3GPP TSG RAN WG1 Meeting #88, Athens, Greece Feb. 13-17, 2017, 7 pages.

Ericsson, "On UL sTTI layout," R1-1703256, 3GPP TSG-RAN WG1 Meeting #88, Athens, Greece Feb. 13-17, 2017, 9 pages.

Ericsson, "Design aspects of sPUCCH," R1-1703262, 3GPP TSG-RAN WG1 #88, Athens, Greece, Feb. 13-17, 2017, 10 pages.

Ericsson, "sPUCCH resource management," R1-1703263, 3GPP TSG-RAN WG1 #88, Athens, Greece, Feb. 13-17, 2017, 7 pages.

\* cited by examiner

FIG. 7
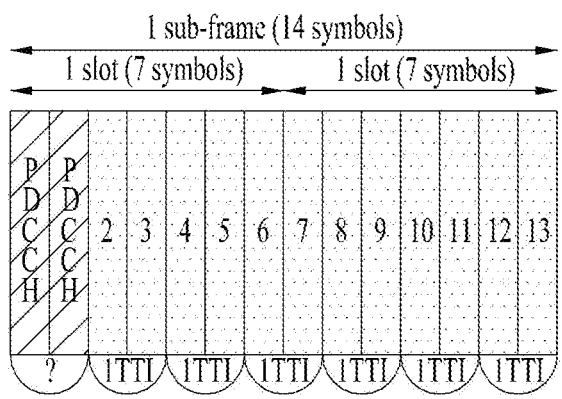
(a) 2 symbol TTI DL structure
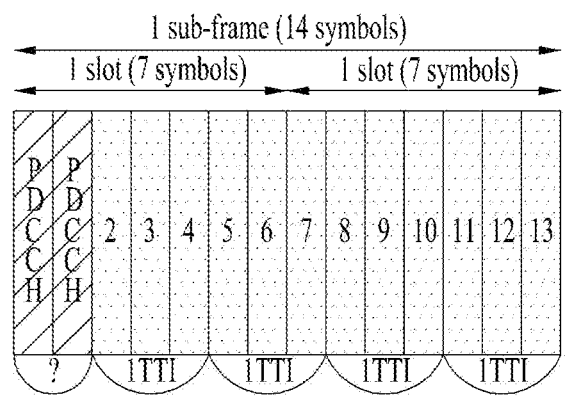
(b) 3 symbol TTI DL structure
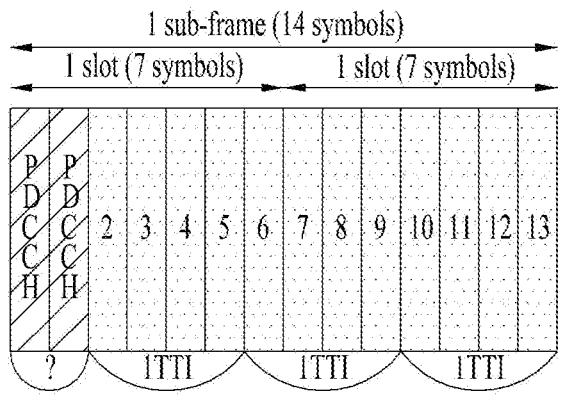
(c) 4 symbol TTI DL structure
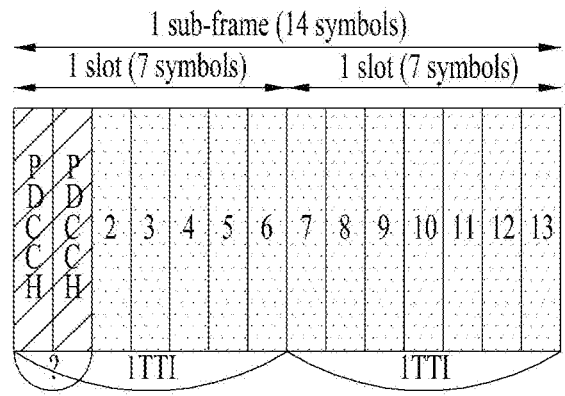
(d) 7 symbol TTI DL structure

METHOD AND APPARATUS FOR TRANSMITTING OR RECEIVING UPLINK SIGNAL FOR TERMINAL SUPPORTING SHORT TTI IN WIRELESS COMMUNICATION SYSTEM

CROSS-REFERENCE TO RELATED APPLICATIONS

This application is a National Stage application under 35 U.S.C. § 371 of International Application No. PCT/KR2018/003351, filed on Mar. 22, 2018, which claims the benefit of U.S. Provisional Application No. 62/569,466, filed on Oct. 6, 2017, U.S. Provisional Application No. 62/565,012, filed on Sep. 28, 2017, U.S. Provisional Application No. 62/544,133, filed on Aug. 11, 2017, U.S. Provisional Application No. 62/543,383, filed on Aug. 10, 2017, U.S. Provisional Application No. 62/505,794, filed on May 12, 2017, and U.S. Provisional Application No. 62/476,607, filed on Mar. 24, 2017. The disclosures of the prior applications are incorporated by reference in their entirety.

TECHNICAL FIELD

The present invention relates to a wireless communication system, and more particularly, a method and apparatus for supporting a plurality of transmission time intervals, a plurality of subcarrier spacing, or a plurality of processing times.

BACKGROUND ART

Latency of packet data is one of important performance metrics and one of important objectives in designs of a next-generation mobile communication system as well as LTE, a so-called new RAT, is to reduce latency and to provide rapider Internet access to an end use.

The present invention proposes the feature related to a method of transmitting or receiving an uplink (UL) signal in a wireless communication system for supporting reduction in latency.

DISCLOSURE

Technical Problem

An object of the present invention devised to solve the problem lies in an uplink (UL) transmission operation of a user equipment (UE) for supporting a plurality of transmission time interval, a plurality of subcarrier spacing, or a plurality of processing times or a UL receiving operation of an eNB that communicates with the UE.

It is to be understood that both the foregoing general description and the following detailed description of the present invention are exemplary and explanatory and are intended to provide further explanation of the invention as claimed.

Technical Solution

The object of the present invention can be achieved by providing an uplink transmitting method for a terminal for supporting a short transmission time interval (TTI) length in a wireless communication system, the method being performed by the terminal and including receiving an enable or disable configuration of frequency hopping for uplink control information, when the frequency hopping is enabled, mapping uplink control information to a short physical uplink control channel (SPUCCH) resource region using the frequency hopping, and transmitting the uplink control information on the SPUCCH resource region, wherein the frequency hopping has different patterns in first and second slots in a subframe.

Additionally or alternatively, the frequency hopping may be applied between first three symbols and the other four symbols in a first slot.

Additionally or alternatively, the frequency hopping may be applied between first four symbols and the other three symbols in a second slot.

Additionally or alternatively, a power transient period may be configured to be positioned in a slot including a larger number of symbols among first and second slots in the subframe.

Additionally or alternatively, when a last symbol in the subframe is used to transmit an uplink reference signal, the method may include transmitting the uplink control information in a SPUCCH region except for the last symbol and the uplink reference signal in the last symbol when the frequency hopping is disabled, or dropping the uplink reference signal or transmitting the uplink reference signal and dropping transmission of uplink control information in the SPUCCH region in a second slot of the subframe when the frequency hopping is enabled.

Additionally or alternatively, when the frequency hopping is enabled, an uplink reference signal to be transmitted in a last symbol in the subframe may not be transmitted irrespective of a simultaneous transmission configuration of the SPUCCH and an uplink reference signal.

Additionally or alternatively, the simultaneous transmission configuration may be configured for a legacy TTI of 1 ms, may be configured for the sTTI, or may be configured for a predetermined SPUCCH format.

In another aspect of the present invention, provided herein is a terminal for transmitting an uplink signal with a short transmission time interval (TTI) length in a wireless communication system includes a receiver and a transmitter, and a processor that controls the receiver and the transmitter, wherein the processor may receive an enable or disable configuration of frequency hopping for uplink control information, map the uplink control information to a short physical uplink control channel (SPUCCH) resource region using the frequency hopping when the frequency hopping is enabled, and transmit the uplink control information on the SPUCCH resource region, wherein the frequency hopping has different patterns in first and second slots in a subframe.

Additionally or alternatively, the frequency hopping may be applied between first three symbols and the other four symbols in a first slot.

Additionally or alternatively, the frequency hopping may be applied between first four symbols and the other three symbols in a second slot.

Additionally or alternatively, a power transient period may be configured to be positioned in a slot including a larger number of symbols among first and second slots in the subframe.

Additionally or alternatively, when a last symbol in the subframe is used to transmit an uplink reference signal, the processor may transmit the uplink control information in a SPUCCH region except for the last symbol and the uplink reference signal in the last symbol when the frequency hopping is disabled, or may drop the uplink reference signal or transmit the uplink reference signal and drops transmission of uplink control information in the SPUCCH region in a second slot of the subframe when the frequency hopping is enabled.

Additionally or alternatively, when the frequency hopping is enabled, an uplink reference signal to be transmitted in a last symbol in the subframe may not be transmitted irrespective of a simultaneous transmission configuration of the SPUCCH and an uplink reference signal.

Additionally or alternatively, the simultaneous transmission configuration may be configured for a legacy TTI of 1 ms, may be configured for the sTTI, or may be configured for a predetermined SPUCCH format.

In another aspect of the present invention, provided herein is an uplink receiving method for a terminal for supporting a short transmission time interval (TTI) length in a wireless communication system is performed by a base station (BS) and including transmitting, to the terminal, an enable or disable configuration of frequency hopping for uplink control information, and when the frequency hopping is enabled, receiving uplink control information mapped to a short physical uplink control channel (SPUCCH) resource region using the frequency hopping, wherein the frequency hopping has different patterns in first and second slots in a subframe.

It is to be understood that both the foregoing general description and the following detailed description of the present invention are exemplary and explanatory and are intended to provide further explanation of the invention as claimed.

Advantageous Effects

According to embodiments of the present invention, uplink (UL) transmission of a terminal for supporting a plurality of transmission time interval (TTI) lengths, a plurality of subcarrier spacing, or a plurality of processing times may be effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a diagram showing a DL subframe structure including a short TTI with a plurality of lengths (symbol numbers);

BEST MODE

Figure 1:
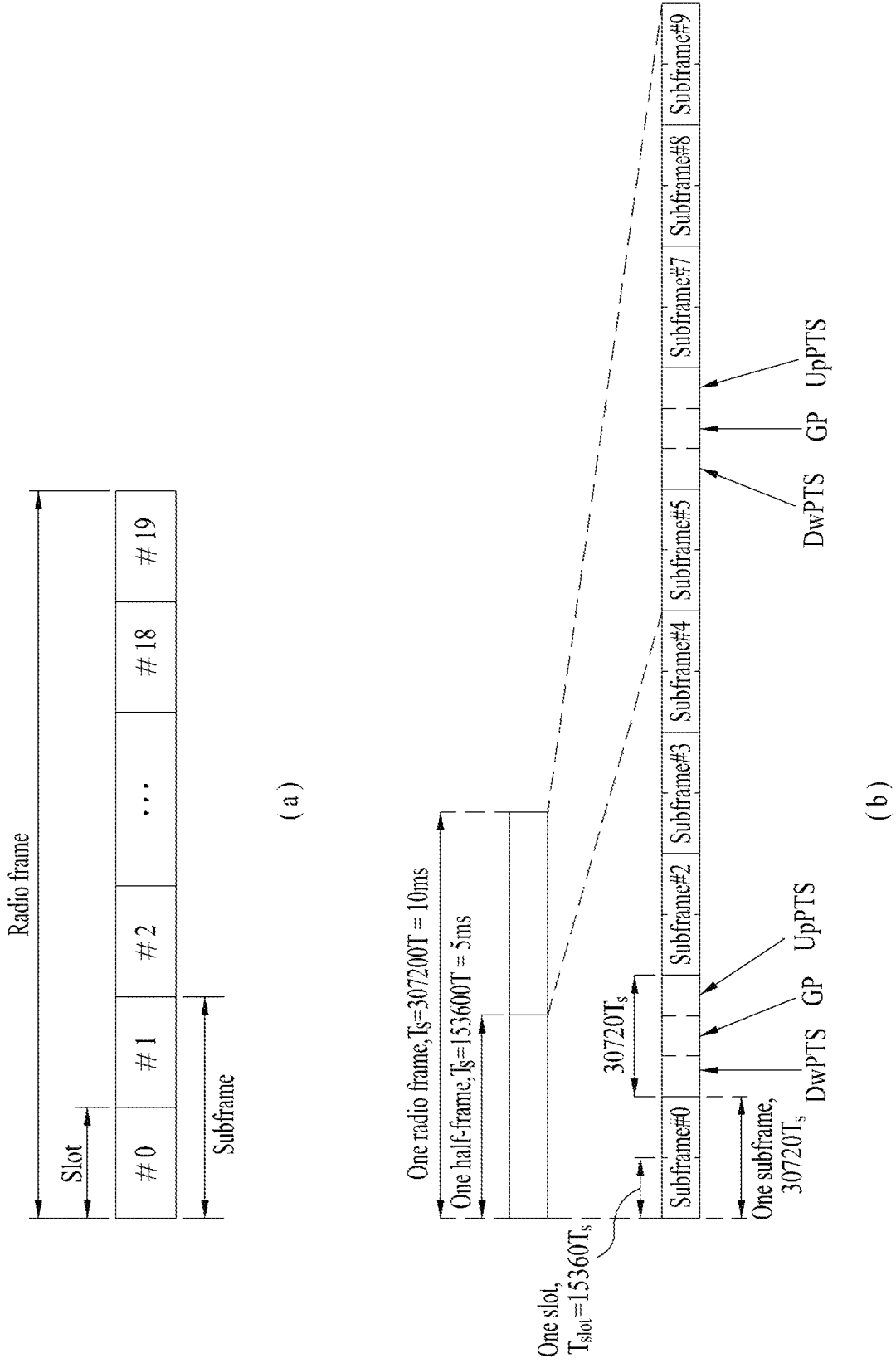
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
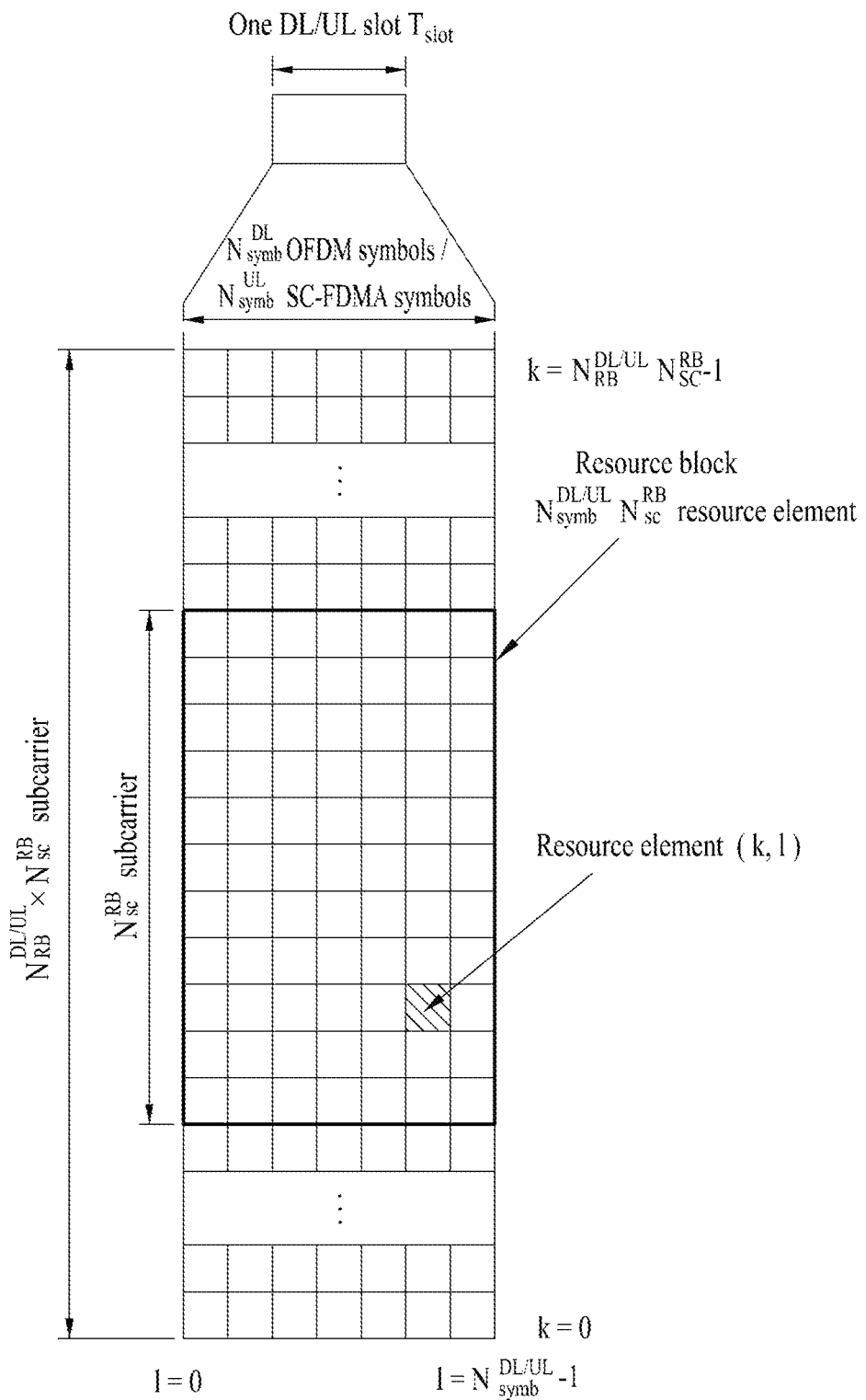
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{RB}^{DL/UL}*N_{sc}^{RB}$ REs. Each RE in a resource grid can be uniquely defined by an index pair (k, l) in a slot. Here, k is an index in the range of 0 to $N_{RB}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
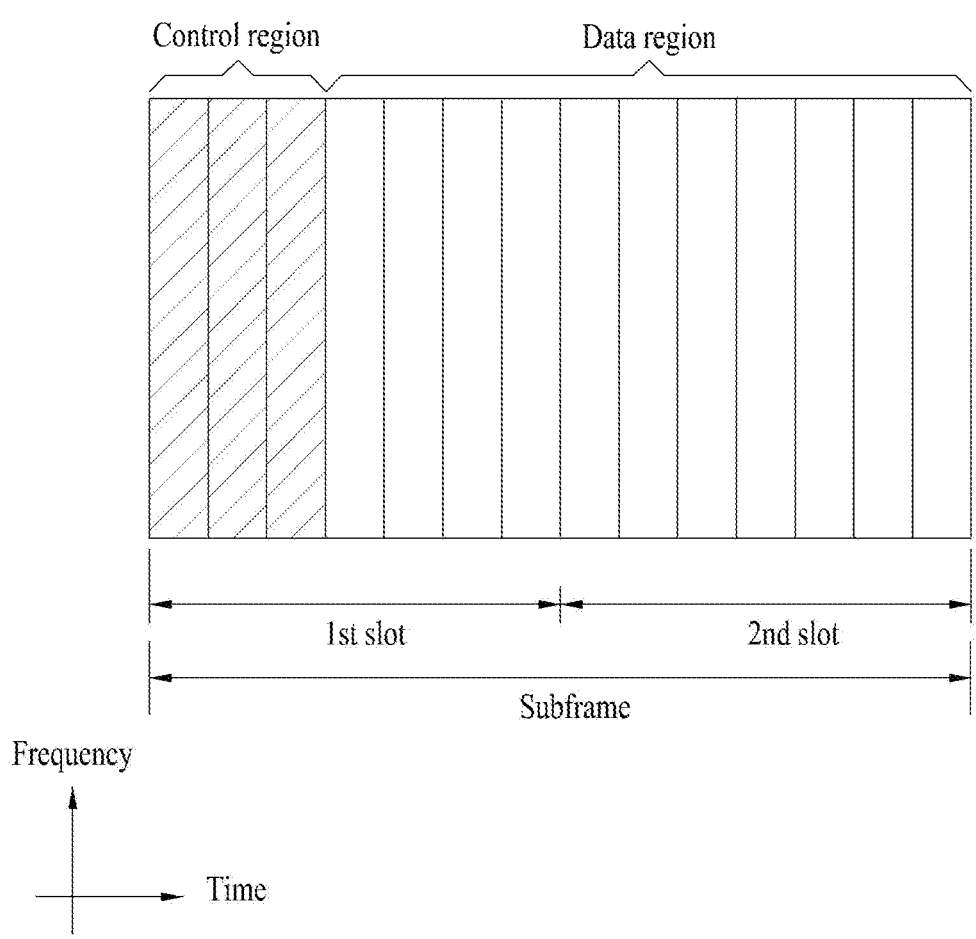
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc.

is included in the PDCCH and transmitted. For example, if a specific PDCCH is CRC (cyclic redundancy check)—masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
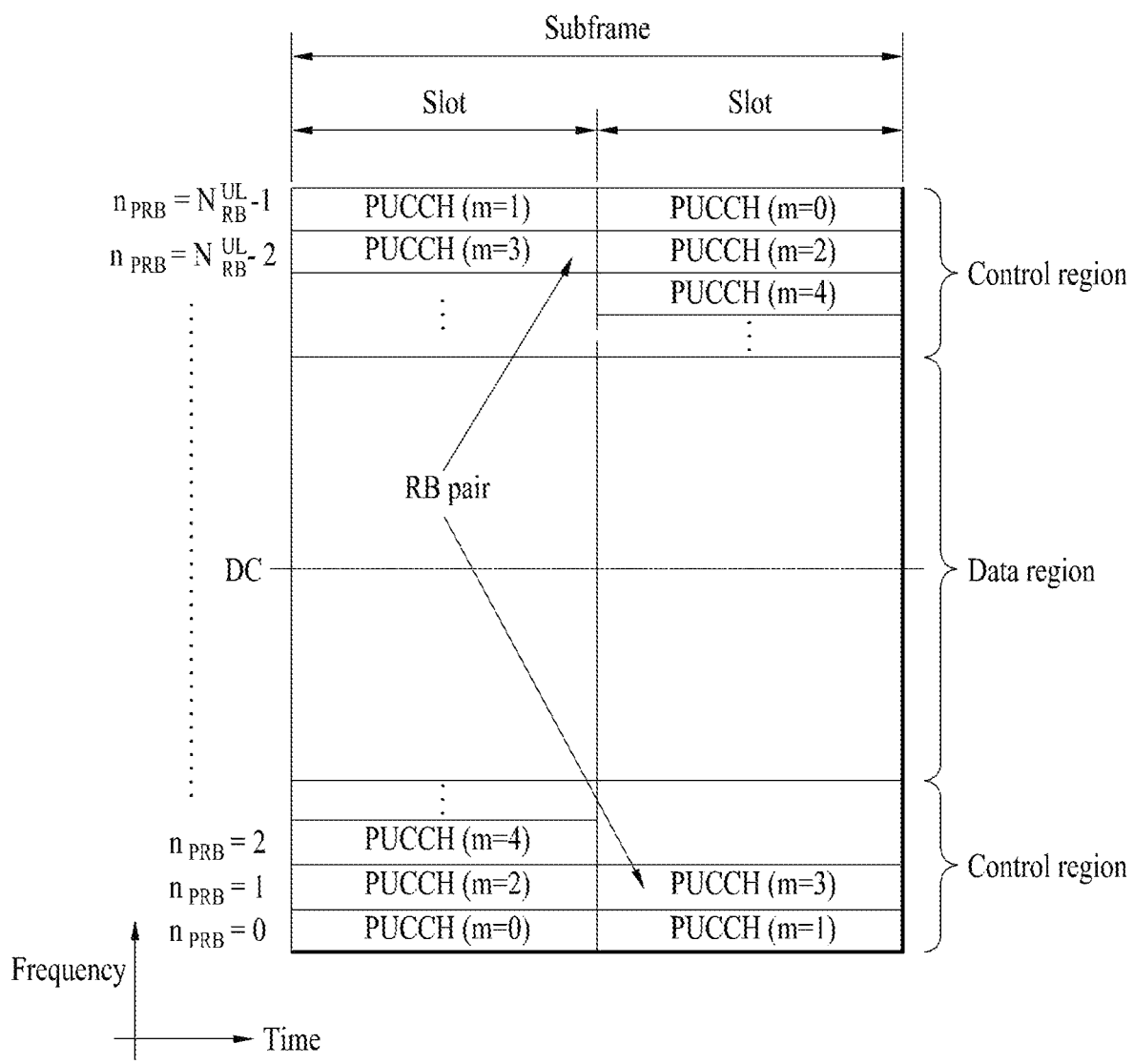
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
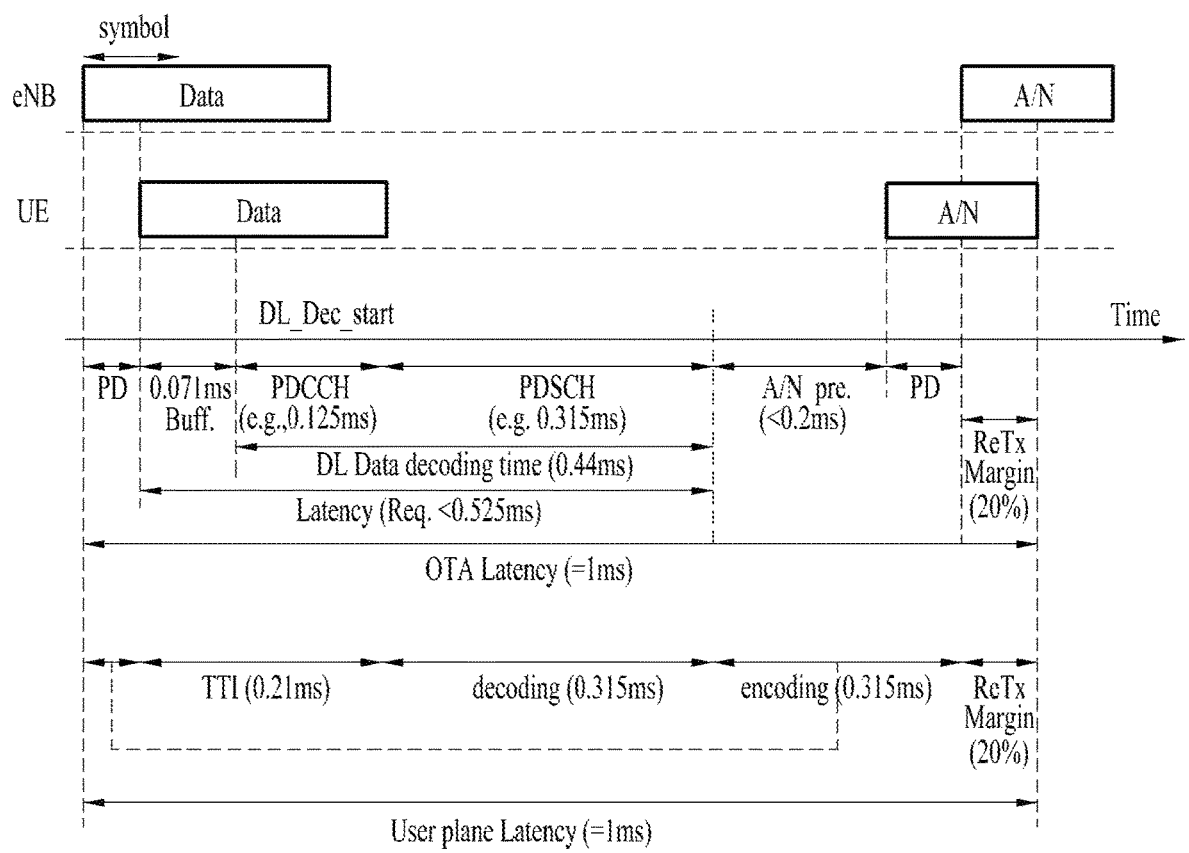
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
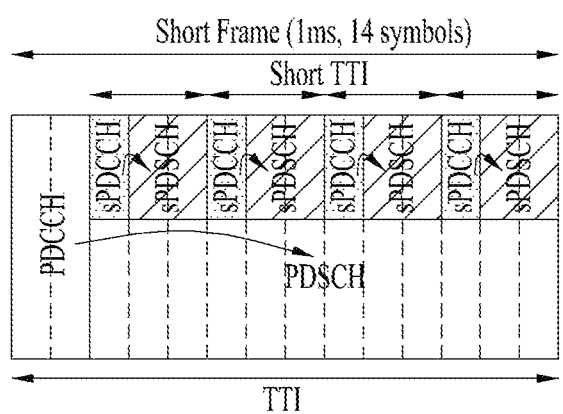
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

In the specification, the present invention is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
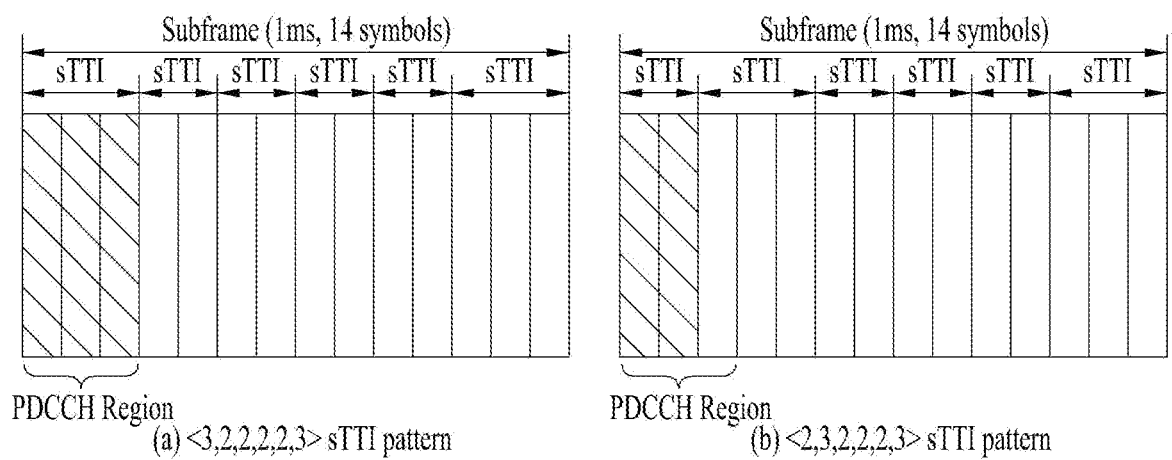
FIG. 8 is a diagram showing a DL subframe structure including a short TTI including two or three symbols.

According to the present invention, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present invention. That is, in the specification, the term "TTI" is referred to instead of sTTI, the term TTI means the sTTI, and regardless of its name, what the present invention proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

Collision Handling of SRS and Other Channels in Case of Dynamic DM-RS Insertion

Considering a "dynamic DM-RS insertion method" in which a network notifies a UE about whether DM-RS transmission for use of demodulation is included every UL sTTI via dynamic signaling, the UE may not expect configuration for transmitting DM-RS and SRS in the same SC-FDMA symbol in a specific sTTI via the dynamic signaling. Alternatively, upon receiving configuration for transmitting the DM-RS and the SRS in the same SC-FDMA symbol in a specific sTTI via the dynamic signaling, the UE may drop the SRS.

Option 1: Particularly, the above rule may be applied only to a specific sTTI in a subframe configured as a cell-specific SRS subframe and may be limited to the case in which the DM-RS and SRS are transmitted in the same serving cell.

Option 2: The above rule may be applied only to a specific sTTI in a subframe configured as a UE-specific periodic SRS subframe and may be limited to the case in which DM-RS and (latent) SRS are transmitted in the same serving cell and/or the corresponding UE is set with a plurality of timing advance groups (TAGs).

Option 3: The above rule may be applied to the case in which sPUSCH is scheduled only to a specific sTTI in a subframe configured as a UE-specific aperiodic SRS subframe and may be limited to the case in which DM-RS and (latent) SRS are transmitted in the same serving cell.

Option 4: The above rule may be applied only to the case in which a frequency resource configured with a cell-specific SRS bandwidth and all or some of frequency resources corresponding to sPUSCH scheduling (or DM-RS) overlap or collide with each other.

Option 5: The above rule may be applied only to the case in which a frequency resource determined via a combination of a UE-specific SRS transmission bandwidth (i.e., srs-bandwidth), an SRS frequency domain position (i.e., freqDomainPosition), and/or an SRS hopping bandwidth (i.e., srs-HoppingBandwidth) and all or some of frequency resources corresponding to sPUSCH scheduling (or DM-RS) overlap or collide with each other.

Option 6: The above rule may be applied only to the case in which SRS determined by a UE-specific transmission comb and a comb of DM-RS indicated via dynamic signaling in a situation in which interleaved FDMA (IFDMA) is enabled are the same. In other words, when SRS determined by a UE-specific transmission comb and a comb of DM-RS indicated via dynamic signaling in a situation in which IFDMA is enabled are different, transmission of the DM-RS and the SRS may be allowed in the same SC-FDMA symbol in a corresponding sTTI.

Option 7: The above rule may be applied only to the case in which an SRS transmission serving cell and a sPUSCH transmissions serving cell are different, transmission timings thereof overlap or collide with each other with respect to a partial or entire sTTI, and a corresponding UE is configured with a plurality of TAGs and is power-limited. In other words, when the SRS transmissions serving cell and the sPUSCH transmissions serving cell are different, transmission timings thereof overlap or collide with each other, and a corresponding UE is configured with a plurality of TAGs but entire transmit power is not greater than P_CMAX, both of the sPUSCH and the SRS may be transmitted.

Option 8: The above rule may be limited only to the case in which SRS transmission timings in a plurality of different serving cells and sPUSCH transmission timings in other different serving cells overlap or collide with each other with respect to a partial or entire sTTI, and a corresponding UE is configured with a plurality of TAGs and is power-limited. More particularly, in this case, all SRS transmissions may be dropped or some SRS transmissions may be dropped and, in this case, the dropped SRS transmission may be determined in consideration of an SRS transmission type (e.g., periodic or aperiodic) and/or a serving cell index (e.g., as high priority as possible is assigned to a low index), etc.

Whether the above rule is applied may be determined according to a combination of all or some of the above options.

Considering a "dynamic DM-RS insertion method" in which a network notifies a UE about whether DM-RS transmission for use of demodulation is included every UL sTTI via dynamic signaling, the UE may not expect configuration for transmitting DM-RS and SRS in adjacent symbols via the dynamic signaling. Alternatively, a rule may be defined to drop the SRS or to drop UL scheduling corresponding to sPUSCH+DM-RS upon receiving configuration for transmitting the DM-RS and the SRS in adjacent symbols via the dynamic signaling. For example, a rule may be defined (1) to drop the SRS, (2) to drop UL scheduling corresponding to sPUSCH+DM-RS, or (3) to transmit all of sPUSCH, DM-RS, and SRS by a UE configured to transmit the DM-RS in a second symbol of sTTI #5 (i.e., $13^{th}$ symbol in a subframe) and to transmit the SRS in a third symbol (i.e., $14^{th}$ symbol in a subframe) of sTTI #5. The methods (1) and (2) may prevent sPUSCH demodulation performance from being degraded by impact of a power transient period to be considered by the SRS on DM-RS of sTTI.

Option 1: Particularly, the rule may be limited only to a specific sTTI in a subframe as a cell-specific SRS subframe and may be limited to the case in which DM-RS and SRS are transmitted in the same serving cell.

Option 2: The rule may be applied only to a specific sTTI in a subframe configured as a UE-specific periodic SRS subframe and may be limited to the case in which DM-RS and (latent) SRS are transmitted in the same serving cell and/or a corresponding UE is configured with a plurality of TAGs.

Option 3: The rule may be applied to the case in which sPUSCH is scheduled only to a specific sTTI in a subframe configured as a UE-specific aperiodic SRS subframe and may be limited to the case in which DM-RS and (latent) SRS are transmitted in the same serving cell.

Option 4: The rule may be limited only to the case in which a frequency resource configured as a cell-specific SRS bandwidth and all or some of frequency resources corresponding to sPUSCH scheduling (or DM-RS) overlap or collide with each other.

Option 5: The rule may be applied only to the case in which a frequency resource determined according to a combination of a UE-specific SRS transmission bandwidth (i.e., srs-bandwidth), an SRS frequency domain position (i.e., freqDomainPosition), and/or an SRS hopping bandwidth (i.e., srs-HoppingBandwidth) and all or some of frequency resources corresponding to sPUSCH scheduling (or DM-RS) overlap or collide with each other.

Option 6: The above rule may be applied only to the case in which SRS determined by a UE-specific transmission comb and a comb of DM-RS indicated via dynamic signaling are the same in a situation in which IFDMA is enabled are the same. In other words, when SRS determined by a UE-specific transmission comb and a comb of DM-RS indicated via dynamic signaling in a situation in which IFDMA is enabled are different, transmission of the DM-RS and the SRS may be allowed in the same SC-FDMA symbol in a corresponding sTTI.

Option 7: The above rule may be applied only to the case in which an SRS transmission serving cell and a sPUSCH transmissions serving cell are different, transmission timings thereof overlap or collide with each other with respect to a partial or entire sTTI, and a corresponding UE is configured with a plurality of TAGs and is power-limited. In other words, when the SRS transmissions serving cell and the sPUSCH transmissions serving cell are different, transmission timings thereof overlap or collide with each other, and a corresponding UE is configured with a plurality of TAGs but entire transmit power is not greater than P_CMAX, both of the sPUSCH and the SRS may be transmitted.

Option 8: The above rule may be limited only to the case in which SRS transmission timings in a plurality of different serving cells and sPUSCH transmission timings in other different serving cells overlap or collide with each other with respect to a partial or entire sTTI, and a corresponding UE is configured with a plurality of TAGs and is power-limited. More particularly, in this case, all SRS transmissions may be dropped or some SRS transmissions may be dropped and, in this case, the dropped SRS transmission may be determined in consideration of an SRS transmission type (e.g., periodic or aperiodic) and/or a serving cell index (e.g., as high priority as possible is assigned to a low index), etc.

Whether the above rule is applied may be determined according to a combination of all or some of the above options.

IFDMA for sPUCCH

IFDMA in which DM-RS corresponding to each TTI is mapped to different resource elements (REs) while DM-RS with respect to a plurality of TTIs is transmitted in the same SC-FDMA symbol has been considered. This may be one of methods for supporting multiplexing of a PUCCH format that is not based on an orthogonal cover code (OCC) (in particular, which is transmitted in a plurality of RBs). In the case of the current PUSCH IFDMA, information about a comb for transmitting a PUSCH IFDMA symbol in a DM-RS cyclic shift field may be joint-encoded and indicted. On the other hand, in the case of PUCCH IFDMA, there is a need for a method of indicating a comb for transmitting a PUCCH IFDMA symbol to support PUCCH IFDMA.

As a method of indicating a comb for PUCCH IFDMA, the comb may be indicated by a specific field of DL assignment DCI. Particularly, a rule may be defined to define an additional bit field indicating a comb or to reinterpret an existing field in the DL assignment DCI to indicate the comb.

A rule may be defined to tie comb information to each state of an ACK/NACK resource indicator (ARI) field, to indicate the comb information through a high layer signal, and to indicate a comb by a state indicated by the ARI in the corresponding DCI through DL assignment DCI.

The PUCCH IFDMA operation may be enabled semi-statically through a high layer signal. Particularly, corresponding configuration may be set independently or different for each TTI length and/or PUCCH format. Alternatively, whether the PUCCH IFDMA is activated may be clearly indicated by adding an additional bit field to a specific DCI format or reusing an existing format. Alternatively, when a TTI length and/or subcarrier spacing of PUCCH, a payload size of UCI to be transmitted by a corresponding PUCCH, and/or a type of UCI transmitted by the corresponding PUCCH may be considered to satisfy a specific condition, the PUCCH IFDMA operation may be enabled.

sPUCCH Hopping Pattern

In the case of 2/3-symbol sTTI, six sTTIs including {3 2 2 2 2 3} symbols may be included in one subframe. In the specification, a number within curly brackets ({ }) may refer to the number of symbols included in each sTTI. The sTTI is merely an appellation because sTTI is shorter than a TTI including 14 OFDM symbols used in an existing wireless communication system including an LTE or LTE-A system, or the like and, thus, may also be referred to as a TTI in a system using a shorter TTI than in the existing case. That is, {3 2 2 2 2 3} means that there are six of total TTIs or sTTIs and {3 2 2 2 2 3} includes 3, 2, 2, 2, 2, and 3 symbols (or OFDM symbols) in the stated order.

When intra-sTTI hopping is supported with respect to 7-symbol sPUCCH, the layout of 2/3-symbol sPUCCH may be considered to determine a hopping pattern. When a hopping pattern is defined as {3 4} symbol for a first sTTI and {3 4} symbol for a second sTTI or {4 3} symbol for a first sTTI and {4 3} symbol for a second sTTI, if a sPUCCH resource is assigned to a specific 7-symbol sTTI, effective coexistence with 2/3-symbol sTTI may be difficult. Accordingly, particularly, in the case of 7-symbol sPUCCH, a hopping pattern may be defined as {3 4} symbol for a first sTTI and {4 3} symbol for a second sTTI in a subframe for multiplexing and compacter resource packing with 2/3-symbol.

A specific UL channel in which hopping intra-sTTI is supported may be transmitted over a plurality of different frequency resources according to a hopping pattern and, in this case, when parts mapped to respective frequency resources include different number of symbols, it may be desirable in terms of demodulation to reduce influence of a power transient period on a part having as small number of symbols as possible. Accordingly, in the above situation, a rule may be defined to position a power transient period for intra-sTTI to more cover a part having as large number of symbols as possible. For example, a rule may be defined to position a power transient period at a 4-symbol part when a hopping pattern is defined as {3 4} symbol for 7-symbol sTTI.

Dynamic DM-RS Insertion

When a sTTI is introduced, it may not be desired in terms of transmission efficiency that DM-RS occupies one symbol every sTTI (e.g., 2/3-symbol sTTI) with respect to a specific sTTI length. Accordingly, when a plurality of consecutive sTTIs are scheduled for one UE, a dynamic DM-RS insertion method in which a network indicates whether DM-RS is transmitted every sTTI through dynamic signaling has been considered.

During scheduling in a specific TTI, a symbol to which UL-SCH or DM-RS is mapped may be indicated through a physical layer signal such as DCI with respect to a corresponding sTTI or other sTTIs before or after the same, and/or a symbol. In more detail, when DCI is transmitted in TTI #n and a processing time (e.g., UL grant-to-UL data transmission timing) is x TTI, a combination of available mappings is as follows.

Alt 1: TTI #n+x: DM-RS and UL-SCH

Alt 2: TTI #n+x: UL-SCH only

Alt 3: TTI #n+x: DM-RS in some symbol(s) within the TTI

Alt 4: TTI #n+x: DM-RS in some symbol(s) within the TTI, and TTI #n+x+k: UL-SCH only, integer with k>=1

Alt 5: TTI #n+x: UL-SCH only, and TTI #n+x+k: DM-RS in some symbol(s) within the TTI, integer with k>=1

Alt 6: TTI #n+x: DM-RS in some symbol(s) within the TTI, and TTI #n+x−k: UL-SCH only, integer with k>=1

Alt 7: TTI #n+x: UL-SCH only, and TTI #n+x−k: DM-RS in some symbol(s) within the TTI, integer with k>=1

Alt 8: During multiple-TTI scheduling, a plurality of (or one) TTIs: DMRS and UL-SCH, and the other plurality of (or one) TTIs: UL-SCH only Embodiment of some mapping thereamong may be possible or not depending on UE capability. For example, in the case of Alt 6 of the mapping, when a processing time is x, if UL-SCH scheduling with respect to TTI #n+x is performed in TTI #n, it may be indicated that DMRS corresponding thereto may be transmitted in TTI #n+x−2 and the UE is not scheduled with respect to TTI #n−2 to TTI #n+x−2 and, thus, even if this situation is not expected, a DM-RS sequence needs to be prepared and to be transmitted to TTI #n+x−2. This means that at least DM-RS transmission needs to be prepared for a shorter time than a processing time that is expected or configured by a UE.

Accordingly, when DCI is transmitted in TTI #n and a processing time (e.g., UL grant-to-UL data transmission timing) is x TTI, a combination of mapping between DMRS and UL-SCH to be indicated may be classified in a plurality of modes and a rule may be defined to report capability about whether a UE is supportable for each mode (or for some modes among modes) to a network. Particularly, a mode for defining the capability (report) signaling may also include a transmission mode that requires a shorter time than a processing time that is generally expected or configured by a UE. More generally, the mode for defining the capability (report) signaling may also include a transmission mode that further requires processing power of a UE. For example, Alt 1 to 5 above (or some of these) and Alt 6 and 7 above (or some of these) may be defined as mode 1 and mode 2, respectively, and capability about whether a UE is supportable may be reported to a network with respect to each of modes 1 and 2 or mode 2.

In addition, a network may also lastly configure a combination of mapping between DMRS and UL-SCH to be indicated to a UE using all or some of the transmission modes. That is, all or only some of the transmission modes may be configured to the UE and the UE and a rule may be defined to interpret DCI based on the configuration and to transmit UL-SCH and DMRS according to indicated mapping among configured combinations.

Alternatively, as described above, a combination of mapping between UL-SCH and DMRS may be defined and all or only some of the combination may be configured for the UE, and a rule may be defined to interpret DCI based on the configuration and to transmit UL-SCH and DMRS according to indicated mapping among configured combinations.

As another method, a combination of mapping between UL-SCH and DMRS supportable by singe-TTI scheduling and multiple-TTI scheduling may be grouped to lastly configure TTI(s) for transmitting DM-RS and UL-SCH. That is, whether the single-TTI scheduling or the multiple-TTI scheduling is used may be configured for the UE through a high layer or a physical layer signal (e.g., group-specific DCI, slow-DCI, or UE-specific DCI) and a rule may be defined to interpret DCI based on the configuration and to transmit UL-SCH and DMRS according to indicated mapping among configured combinations. For example, during single-TTI scheduling, a candidate of a combination of mapping between UL-SCH and DMRS may be determined according to Alt 1 to 5 above (or some of these), during multiple-TTI scheduling, a candidate of a combination of mapping between UL-SCH and DMRS may be determined according to Alt 1 to 8 above (or some of these), and a rule may be defined to transmit UL-SCH and DMRS according to indicated mapping among the determined combinations.

sPUCCH with SRS

As described above, in the case of 7-symbol sPUCCH, when a hopping pattern is defined as {3 4} symbol for a first sTTI and {4 3} symbol for a second sTTI in a subframe for multiplexing and simpler resource packing with 2/3-symbol, there is a need to define handling of a situation in which a last symbol in a subframe is an SRS symbol.

To process the above situation, sPUCCH (i.e., shortened sPUCCH) needs to be transmitted except for transmission/mapping of a last symbol in a second sTTI in a subframe and, in this regard, whether the shortened sPUCCH is transmitted to a UE may be configured through a high layer signal. Alternatively, to configure whether the shortened sPUCCH is transmitted, whether the shortened sPUCCH is transmitted may be configured to the UE in the form of simultaneous transmission configuration of UCI and SRS. Whether the shortened sPUCCH is transmitted may be configured according to existing simultaneous transmission configuration ACK/NACK and SRS and, for example, when the simultaneous transmissions is configured, a rule may be defined to also transmit the shortened sPUCCH and to transmit a normal sPUCCH when the simultaneous transmission is disable. Alternatively, separate simultaneous transmission configuration of ACK/NACK and SRS may be defined for a sTTI and simultaneous transmission of the shortened sPUCCH and the SRS may also be determined according to the configuration. In more detail, the separate simultaneous transmission configuration of the ACK/NACK and the SRS may be defined for a sTTI independently (differently) for each sPUCCH format (or for each payload size of UCI), the simultaneous transmission of a specific sPUCCH format and the SRS may be determined according to the configuration, and whether simultaneous transmission is performed may be determined independently (differently) for each sPUCCH format.

As one method, intra-sTTI hoping may be configured with respect to a specific 7-symbol sPUCCH format (e.g., a sPUCCH format carrying up to 2 bits or greater bits than 3 bits) and, in this regard, a rule may be defined to differently determine a method of transmitting SRS and/or sPUCCH according to whether intra-sTTI hopping is configured.

Particularly, a rule may be defined to transmit sPUCCH (i.e., shortened sPUCCH) except for transmission/mapping of a last symbol of a second sTTI in a subframe and to transmit SRS in a last symbol when intra-sTTI hopping is disabled. A rule may be defined to transmit sPUCCH in a second sTTI in a subframe and to drop SRS or to drop sPUCCH and to transmit SRS when intra-sTTI hopping is enabled. The present rule may not be complied irrespective of whether "simultaneous transmission of the shortened sPUCCH and the SRS" is configured and, in this case, the shortened sPUCCH may be transmitted and the SRS may be transmitted in a last symbol. Particularly, the present rule may be exceptionally applied only to the SRS subframe.

As another example, when intra-sTTI hopping is disabled, an existing LTE operation may be complied and, a rule may also be defined to unconditionally drop SRS and to hop and transmit normal sPUCCH irrespective of whether simultaneous transmission of ACK/NACK and SRS is configured when intra-sTTI hopping is enabled. Here, the simultaneous transmission configuration of ACK/NACK and SRS may be for an existing TTI of 1 ms TTI or may be a separately defined for a sTTI or a specific sPUCCH format.

As another method, a rule may be defined to always drop SRS and to transmit sPUCCH in a second sTTI in a subframe irrespective of whether enabling of intra-sTTI hopping is configured with respect to a specific 7-symbol sPUCCH format (e.g., a sPUCCH format carrying up to 2 bits or greater bits than 3 bits). Particularly, the present rule may be exceptionally applied only to the SRS subframe.

As another method, a rule may be defined to transmit sPUCCH with hopping applied thereto in a first sTTI in a subframe, to transmit sPUCCH to which transmission/mapping of a last symbol is excluded and hopping is not applied, and to transmit SRS in a last symbol when intra-sTTI hopping is enabled with respect to a specific 7-symbol sPUCCH format (e.g., a sPUCCH format carrying up to 2 bits or greater bits than 3 bits). Particularly, the present rule may be exceptionally applied only to the SRS subframe.

As another method, a rule may be defined to allow a non-hopping operation of a UE, to transmit sPUCCH except for transmission/mapping of a last symbol in a second sTTI (i.e., shortened sPUCCH), and to transmit SRS in a last symbol when "configuration for simultaneous transmission of the shortened sPUCCH and the SRS" is enabled in a state in which intra-sTTI hopping is enabled. The rule may not be complied irrespective of whether "intra-sTTI hopping" is configured and, in this case, the non-hopping shortened sPUCCH may be transmitted and the SRS may be transmitted in a last symbol. Particularly, the present rule may be exceptionally applied only to the SRS subframe.

As another method, a rule may be defined to always disregard intra-sTTI hopping configuration and to transmit non-hopping sPUCCH only in an SRS subframe when intra-sTTI hopping is enabled irrespective of "simultaneous transmission of shortened sPUCCH and SRS" is configured.

Beta Offset with Dynamic DMRS Insertion

According to the LTE standard, when UCI is transmitted in PUSCH, the number of coded symbols (i.e., REs in the LTE standard) for transmission of the corresponding UCI may be calculated as follows.

[Reference 1]

When the UE transmits HARQ-ACK bits, rank indicator bits or CRI bits, it shall determine the number of coded modulation symbols per layer Q' for HARQ-ACK, rank indicator, or CRI bits as follows.

For the case when only one transport block is transmitted in the PUSCH conveying HARQ-ACK bits, rank indicator bits or CRI bits:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

where

O is the number of HARQ-ACK bits, rank indicator bits or CRI bits, and $M_{sc}^{PUSCH}$ is the scheduled bandwidth for PUSCH transmission in the current sub-frame for the transport block, expressed as a number of subcarriers in [2], and $N_{symb}^{PUSCH-initial}$ is the number of SC-FDMA symbols per subframe for initial PUSCH transmission for the same transport block, respectively, given by $N_{symb}^{PUSCH-initial} = (2 \cdot (N_{symb}^{UL}-1) - N_{SRS} - N_{start}^{PUSCH} - N_{end}^{PUSCH})$, where $N_{SRS}$ is equal to 1 if UE configured with one UL cell is configured to send PUSCH and SRS in the same subframe for initial transmission, or if UE transmits PUSCH and SRS in the same subframe in the same serving cell for initial transmission, or if the PUSCH resource allocation for initial transmission even partially overlaps with the cell-specific SRS subframe and bandwidth configuration defined in section 5.5.3 of [2], or if the subframe for initial transmission in the same serving cell is a UE-specific type-1 SRS subframe as defined in Section 8.2 of [3], in if the subframe for initial transmission in the same serving cell is a UE-specific type-0 SRS subframe as defined in section 8.2 of [3] and the UE is configured with multiple TAGs.

Otherwise $N_{SRS}$ is equal to 0.

$N_{start}^{PUSCH}$ is equal to 1 when the UE configured for uplink transmission on a LAA SCell is indicated to transmit the PUSCH not starting from the beginning of the first symbol of the subframe, otherwise is equal to 0.

$N_{end}^{PUSCH}$ is equal to 1 when UE configured for uplink transmission on a LAA SCell is indicated to transmit the PUSCH up to the second to last symbol of the subframe and $N_{SRS}$ is equal to 0, otherwise is equal to 0.

$M_{sc}^{PUSCH-initial}$, C, and K, are obtained from the initial PDCCH or EPDCCH or MPDCCH for the same transport block. If there is no initial PDCCH or EPDCCH with DCI format 0 or MPDCCH with DCI format 6-0A/6-0B for the same transport block, $M_{sc}^{PUSCH-initial}$, C, and K, shall be determined from:

the most recent semi-persistent scheduling assignment PDCCH or EPDCCH or MPDCCH, when the initial PUSCH for the same transport block is semi-persistently scheduled, or, the random access response grant for the same transport block, when the PUSCH is initiated by the random access response grant.

[Reference 2]

For the case when two transport blocks are transmitted in the PUSCH conveying the HARQ-ACK bits, rank indicator bits or CRI bits:

$$Q' = \max[\min(Q'_{temp}, 4 \cdot M_{sc}^{PUSCH}), Q'_{min}] \text{ with}$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(3)} \cdot N_{symb}^{PUSCH-initial(3)}} \right\rceil$$

where

O is the number of HARQ-ACK bits, rank indicator bits or CRI bits, and $Q'_{min} = O$ if $O \leq 2$, $Q'_{min} = \lceil 2O/Q'_m \rceil$ if $3 \leq O \leq 11$ with $Q'_m = \min(Q_m^1, Q_m^2)$ where $Q'_m$, $x=\{1,2\}$ is the modulation order of transport block "x", and $Q'_{min} = \lceil 2O_1/Q'_m \rceil + \lceil 2O_2/Q'_m \rceil$ if $O > 11$ with $O_1 = \lceil O/2 \rceil$ and $O_2 = O - \lceil O/2 \rceil$.

$M_{sc}^{PUSCH-initial(x)}, x=\{1,2\}$ are the scheduled bandwidths for PUSCH transmission in the initial sub-frame for the first and second transport block, respectively, expressed as a number of subcarriers in [2], and $N_{symb}^{PUSCH-initial(x)}, x=\{1,2\}$ are the number of SC-FDMA symbols per subframe for initial PUSCH transmission for the first and second transport block given by $N_{symb}^{PUSCH-initial(x)} = (2 \cdot (N_{symb}^{UL}-1) - N_{SRS}^{(x)} - N_{start}^{PUSCH(x)} - N_{end}^{PUSCH(x)}), x=\{1,2\}$, where $N_{SRS}^{(x)}, x=\{1,2\}$ is equal to 1 if UE configured with one UL cell is configured to send PUSCH and SRS in the same subframe for initial transmission, or if UE transmits PUSCH and SRS in the same subframe in the same serving cell for initial transmission of transport block "x", or if the PUSCH resource allocation for initial transmission of transport bock "x" even partially overlaps with the cell-specific SRS subframe and bandwidth configuration defined in section 5.5.3 of [2], or if the subframe for initial transmission of transport block "x" in the same serving cell is a UE-specific type-1 SRS subframe as defined in Section 8.2 of [3], or if the subframe for initial transmission of transport block "x" in the same serving cell is a UE-specific type-0 SRS subframe as defined in section 8.2 of [3] and the UE is configured with multiple TAGS.

Otherwise $N_{SRS}^{(x)}$, x={1,2} is equal to 0.

$N_{start}^{PUSCH(x)}$, x={1,2} is equal to 1 when the configured for uplink transmission on a LAA SCell is indicated to transmit the PUSCH for the first and second transport block not starting from the beginning of the first symbol of the subframe, otherwise is equal to 0.

$N_{end}^{PUSCH(x)}$, x={1,2} is equal to 1 when the UE configured for uplink transmission on a LAA SCell is indicated to transmit the PUSCH for the first and second transport block up to the second to last symbol of the subframe and $N_{SRS}^{(x)}$, x={1,2} is equal to 0, otherwise is equal to 0.

$M_{sc}^{PUSCH\text{-}initial(x)}$, x={1,2}, $C^{(x)}$, x={1,2}, and $K_r^{(x)}$, x={1,2} are obtained from the initial PDCCH or EPDCCH for the corresponding transport block.

[Reference 3]

For HARQ-ACK, $Q_{ACK}=Q_m \cdot Q'$ and $\beta_{offset}^{PUSCH}=\beta_{offset}^{HARQ\text{-}ACK}$, where $Q_m$ is the modulation order of a given transport block. For UEs configured with no more than five DL cells, $\beta_{offset}^{HARQ\text{-}ACK}$ shall be determined according to [3] depending on the number of transmission codewords for the corresponding PUSCH. For UEs configured with more than five DL cells, $\beta_{offset}^{HARQ\text{-}ACK}$ shall be determined according to [3] depending on the number of transmission codewords for the corresponding PUSCH and the number of HARQ-ACK feedback bits.

For rank indication or CRI, $Q_{RI}=Q_m \cdot Q'$, $Q_{CRI}=Q_m \cdot Q'$ and $\beta_{offset}^{PUSCH}=\beta_{offset}^{RI}$, where $Q_m$ is the modulation order of a given transport block, and $\beta_{offset}^{RI}$ shall be determined according to [3] depending on the number of transmission codewords for the corresponding PUSCH, and on the uplink power control subframe set for the corresponding PUSCH when two uplink power control subframe sets are configured by higher layers for the cell.

According to the standard information, when the amount of information to be transmitted based on information to be currently transmitted (which may be initial information or retransmitted information) compared with a total number of REs for data, the number of symbols per layer of UCI may be reduced.

When a "dynamic DM-RS insertion" method in which a network indicates whether DM-RS is transmitted every TTI through dynamic signaling is introduced, a total number of REs for data transmission may be different for each TTI. For example, i) when a 2-symbol TTI includes one data symbol and one DM-RS symbol and ii) the 2-symbol TTI includes only two data symbols, the number of REs for data transmission may have a ratio of 1:2 for the respective cases and, thus, the numbers of REs for data transmission may be different by two times between the two cases. Accordingly, beta offset configuration for determination of the number of the UCI transmission UEs needs to be defined as follows.

Option 1: A rule may be defined to apply different beta offset values according to whether DM-RS is present in a TTI. Particularly, a rule may be defined to configure beta offset of the case in which the DM-RS is present through a high layer (or physical layer) signal and to apply beta offset to be applied when the DM-RS is not present as a relatively large value that is increased from the configured value by as much as a predetermined (or signaled) value. This is because, since a total number of REs for data transmission is increased in the case of a TTI in which DM-RS is not present, a coding rate is relatively lowered and, thus, the number of UCI transmission REs needs to be increased to also increase the reliability of UCI transmission therewith. Alternatively, to obtain the same effect, a rule may also be defined to configure beta offset of the case in which DM-RS is not present through a high layer (or physical layer) signal and to apply beta offset to be applied when the DM-RS is present as a relatively small value that is reduced from the configured value by as much as a predetermined (or signaled) value.

Option 2: As another method, a rule may be defined to configure beta offset of the case in which DM-RS is present through a high layer (or physical layer) signal and to apply beta offset of the case in which DM-RS is not present as a relatively small value that is reduced from the configured value by as much as a predetermined (or signaled) value. This is because the number of UCI transmission REs needs to be prevented from being excessively increased since a TTI in which DM-RS is not present has degraded decoding performance compared with self-contained TTI (sTTI including DM-RS). Alternatively, to obtain the same effect, a rule may also be defined to configure beta offset of the case in which DM-RS is not present through a high layer (or physical layer) signal and to apply beta offset to be applied when the DM-RS is present as a relatively high value that is increased from the configured value by as much as a predetermined (or signaled) value.

Option 3: A rule may be defined to always apply the same beta offset irrespective of whether DM-RS is present in TTI.

Option 4: Beta offset to be applied of the case in which DM-RS is present or is not present may be independently (differently) configured through a high layer (physical layer) signal.

Option 1 above, Option 2 above, Option 3 above, and/or Option 4 above have different uses and, thus, some (or all) options to be applied to a UE among the above options may be configured through a high (or physical) layer signal by a network. Alternatively, one option may be configured or introduced and whether the corresponding option is actually applied may be configured through a high (or physical) layer signal.

The aforementioned proposed methods may be included in one of embodiments of the present invention and, thus, may be considered as a type of proposed methods. The aforementioned proposed methods may be independently embodied but may be embodied in a combination (or union) of some of the proposed methods. A rule may be defined to indicate information on whether the proposed methods are applied (or information on the rule of the proposed methods) to a UE through a predefined signal (e.g., a physical layer signal or a high layer signal).

Figure 9:
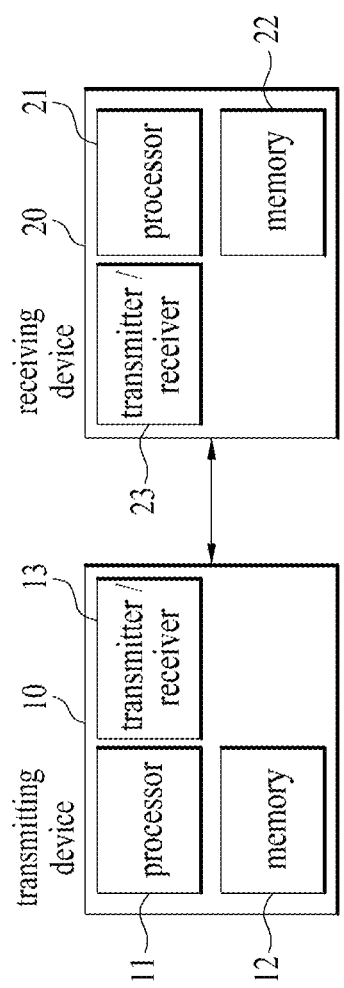
FIG. 9 is a block diagram showing an apparatus for embodying embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

According to one of these embodiments, a terminal for transmitting a UL signal with a short transmission time interval (TTI) length in a wireless communication system may include a receiver and a transmitter, and a processor that controls the receiver and the transmitter and, in this case, the processor may receive enabling or disable configuration for frequency hopping for UL control information and, when the frequency hopping is enabled, map UL control information to a short physical uplink control channel (SPUCCH) resource region using the frequency hopping and transmit the UL control information on the SPUCCH resource region, and the frequency hopping may have different pattern in first and second slots in a subframe.

Further, the frequency hopping may be applied between first three symbols and the other four symbols in a first symbol.

Further, the frequency hopping may be applied between first four symbols and the other three symbols in a second slot.

Also, a power transient period may be configured to be positioned in a slot including a larger number of symbols among the first and second slots in the subframe.

When a last symbol in the subframe is used to transmit a UL RS, the method may include transmitting the UL control information in a SPUCCH region except for the last symbol and the UL RS in the last symbol when the frequency hopping is disabled or dropping the UL RS or transmitting the UL RS and dropping transmission of the UL control information in the SPUCCH region in a second slot of the subframe if the frequency hopping is enabled.

When the frequency hopping is enabled, a UL RS to be transmitted in a last symbol in the subframe may not be transmitted irrespective of simultaneous transmission configuration of the SPUCCH and the UL RS.

In addition, the simultaneous transmission configuration may be for a legacy TTI of 1 ms, for the sTTI, or a predetermined SPUCCH format.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. A method for transmitting uplink control information to a base station by a terminal supporting a short transmission time interval (TTI) length in a wireless communication system, the method comprising:
receiving an enable or disable configuration of frequency hopping for the uplink control information;
based on the frequency hopping being enabled, mapping the uplink control information to a short physical uplink control channel (SPUCCH) resource region using the frequency hopping; and
transmitting the uplink control information on the SPUCCH resource region,
wherein the frequency hopping has different patterns in first and second slots in a subframe, and
wherein, based on the frequency hopping being enabled, an uplink reference signal to be transmitted in a last symbol in the subframe is not transmitted irrespective of a simultaneous transmission configuration of the SPUCCH and the uplink reference signal.

2. The method according to claim 1, wherein the frequency hopping is applied between first three symbols and the other four symbols in a first slot.

3. The method according to claim 1, wherein the frequency hopping is applied between first four symbols and the other three symbols in a second slot.

4. The method according to claim 1, wherein the simultaneous transmission configuration is configured for a legacy TTI of 1 ms, is configured for the short TTI, or is configured for a predetermined SPUCCH format.

5. A terminal configured to support a short transmission time interval (TTI) length in a wireless communication system, the terminal comprising:
a receiver and a transmitter; and
a processor configured to control the receiver and the transmitter,
wherein the processor is further configured to control the terminal to:
receive an enable or disable configuration of frequency hopping for uplink control information,
map the uplink control information to a short physical uplink control channel (SPUCCH) resource region using the frequency hopping based on the frequency hopping being enabled, and
transmit the uplink control information on the SPUCCH resource region,
wherein the frequency hopping has different patterns in first and second slots in a subframe, and
wherein, based on the frequency hopping being enabled, an uplink reference signal to be transmitted in a last symbol in the subframe is not transmitted irrespective of a simultaneous transmission configuration of the SPUCCH and the uplink reference signal.

6. The terminal according to claim 5, wherein the frequency hopping is applied between first three symbols and the other four symbols in a first slot.

7. The terminal according to claim 5, wherein the frequency hopping is applied between first four symbols and the other three symbols in a second slot.

8. The terminal according to claim 5, wherein the simultaneous transmission configuration is configured for a legacy TTI of 1 ms, is configured for the short TTI, or is configured for a predetermined SPUCCH format.

9. A method for receiving uplink control information from a terminal supporting a short transmission time interval (TTI) length by a base station in a wireless communication system, the method comprising:
transmitting, to the terminal, an enable or disable configuration of frequency hopping for the uplink control information; and
based on the frequency hopping being enabled, receiving the uplink control information mapped to a short physical uplink control channel (SPUCCH) resource region using the frequency hopping,
wherein the frequency hopping has different patterns in first and second slots in a subframe, and
wherein, based on the frequency hopping being enabled, an uplink reference signal to be transmitted in a last symbol in the subframe is not transmitted irrespective of a simultaneous transmission configuration of the SPUCCH and the uplink reference signal.

* * * * *